(12) United States Patent
Noda et al.

(10) Patent No.: US 6,434,325 B1
(45) Date of Patent: *Aug. 13, 2002

(54) ELECTRONIC DEVICE WITH DEVICE INFORMATION DISPLAY

(75) Inventors: Yasushi Noda, Tokyo; Yasuyuki Inoue, Saitama, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,719

(22) Filed: Jun. 28, 1996

(30) Foreign Application Priority Data

Jul. 3, 1995 (JP) .............................. 7-167759

(51) Int. Cl.$^7$ .............................. H04N 5/225
(52) U.S. Cl. ...................... 386/118; 358/906
(58) Field of Search ................ 386/107, 117, 386/46, 118; 358/906, 909.1; 348/372, 374, 375, 333, 373, 376; 320/124, 131; 361/680; 396/539

(56) References Cited

U.S. PATENT DOCUMENTS

| | | | | |
|---|---|---|---|---|
| 4,553,081 A | * | 11/1985 | Koenck | 320/131 |
| 4,637,403 A | * | 1/1987 | Garcia et al. | 128/770 |
| 4,967,278 A | * | 10/1990 | Greenbaum | 358/906 |
| 5,023,824 A | * | 6/1991 | Chadima, Jr. et al. | 361/680 |
| 5,077,572 A | * | 12/1991 | Morisawa | 396/539 |
| 5,189,524 A | * | 2/1993 | Yoshida et al. | 358/906 |
| 5,231,511 A | * | 7/1993 | Kodama et al. | 358/906 |
| 5,233,667 A | * | 8/1993 | Lee | 358/906 |
| 5,270,702 A | * | 12/1993 | Krolax | 340/825.44 |
| 5,469,271 A | * | 11/1995 | Hoshino et al. | 358/906 |
| 5,499,052 A | * | 3/1996 | Nakanishi et al. | 358/906 |
| 5,539,463 A | * | 7/1996 | Morikawa et al. | 348/374 |
| 5,644,302 A | * | 7/1997 | Hana et al. | 340/825.06 |
| 5,764,031 A | * | 6/1998 | Mishima | 320/124 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

A video tape recorder integrally combined with a video camera has a housing having a battery casing for accommodating a battery therein and a battery cover mounted on the housing for openably closing the battery casing. A display unit for displaying various pieces of information relative to the video tape recorder is mounted on the battery cover. The battery cover also supports various control keys thereon, and includes a battery storage area for storing a backup battery.

3 Claims, 8 Drawing Sheets

```
Menus

[Automatic Shutter]   on
Digital Zoom
Wide TV
Zebra
Remote Control
Announcement Buzzer
Headphones
↓
```

FIG. 8B

```
Menus
↑
Headphones
EVF Mode
Time-Lapse Shooting
Interval Shooting
Self-Timer
Custom Preset
[Dating                    ]
```

ELECTRONIC DEVICE WITH DEVICE INFORMATION DISPLAY

BACKGROUND OF THE INVENTION

1. Field of the Invention

The present invention relates to an electronic device powered by a battery inserted therein, and more particularly to an electronic device having a battery casing and a battery cover which incorporates a display unit for displaying various pieces of information relative to the electronic device.

2. Description of the Related Art

Electronic devices such as video tape recorders (VTRs) integrally combined with video cameras have a display unit for displaying various pieces of information including operation statuses, modes, a time counter, warning messages, a remaining battery energy level, etc.

The display unit generally comprises a liquid crystal display (LCD) unit, which is located in a region of the electronic device that can visually be recognized with ease.

In recent years, VTRs integrally combined with video cameras incorporate many functions, and hence display units of such VTRs tend to be relatively large in size for displaying a wide variety of information concerning those many functions.

On the other hand, VTRs integrally combined with video cameras themselves are required to be smaller in size for better portability and handling capability. Since such small-size VTRs integrally combined with video cameras have a limited space available for display units, the VTR designers have been making great efforts to establish a location for large-size display units on the VTRs integrally combined with video cameras.

SUMMARY OF THE INVENTION

It is an object of the present invention to provide an electronic device having a display unit, control keys, and a battery storage area positioned in a manner to effectively utilize a limited space available on the electronic device.

According to an aspect of the present invention, there is provided an electronic device comprising a housing having a battery casing for accommodating a battery therein, battery cover means mounted on the housing for openably enclosing the battery casing, and display means mounted on the battery cover means, for displaying information relative to the electronic device.

According to another aspect of the present invention, there is provided an electronic device comprising a housing having a battery casing for accommodating a battery therein, battery cover means mounted on the housing for openably enclosing the battery casing, and control means mounted on the battery cover means, for controlling the electronic device.

According to still another aspect of the present invention, there is provided an electronic device comprising a housing having a battery casing for accommodating a battery therein, battery cover means mounted on the housing for openably enclosing the battery casing, and storage means mounted in the battery cover means, for storing a backup battery.

According to a further aspect of the present invention, there is provided an electronic device comprising a housing having a battery casing for accommodating a battery therein, battery cover means mounted on the housing for openably enclosing the battery casing, battery lock means for retaining the battery against removal from the battery casing, and means for preventing the battery cover means from fully closing the battery casing when the battery is incompletely accommodated in the battery casing.

DETAILED DESCRIPTION OF THE PREFERRED EMBODIMENT

Figure 1:
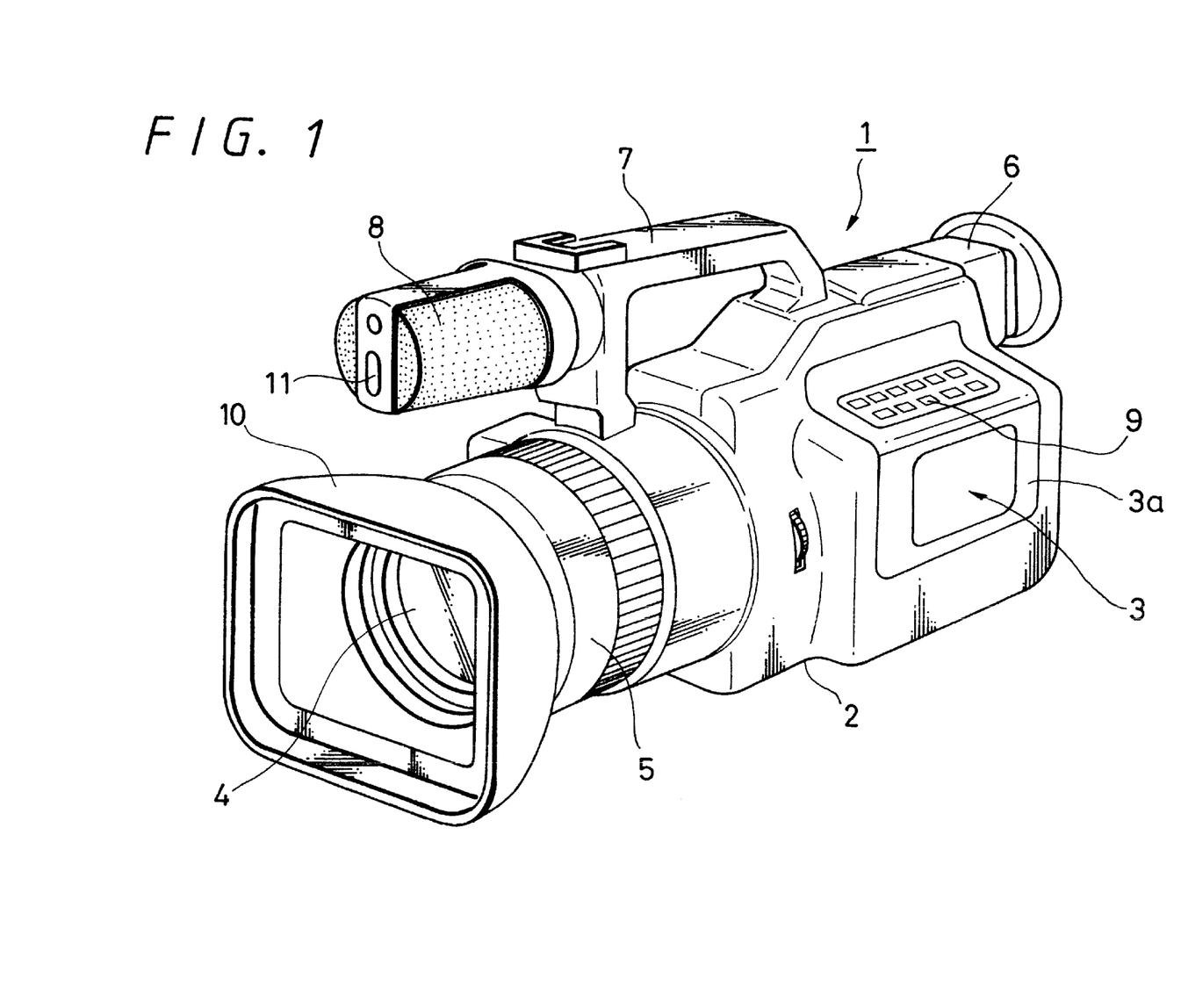
FIG. 1 is a perspective view of a VTR integrally combined with a video camera as an electronic device according to the present invention.
Figure 2:
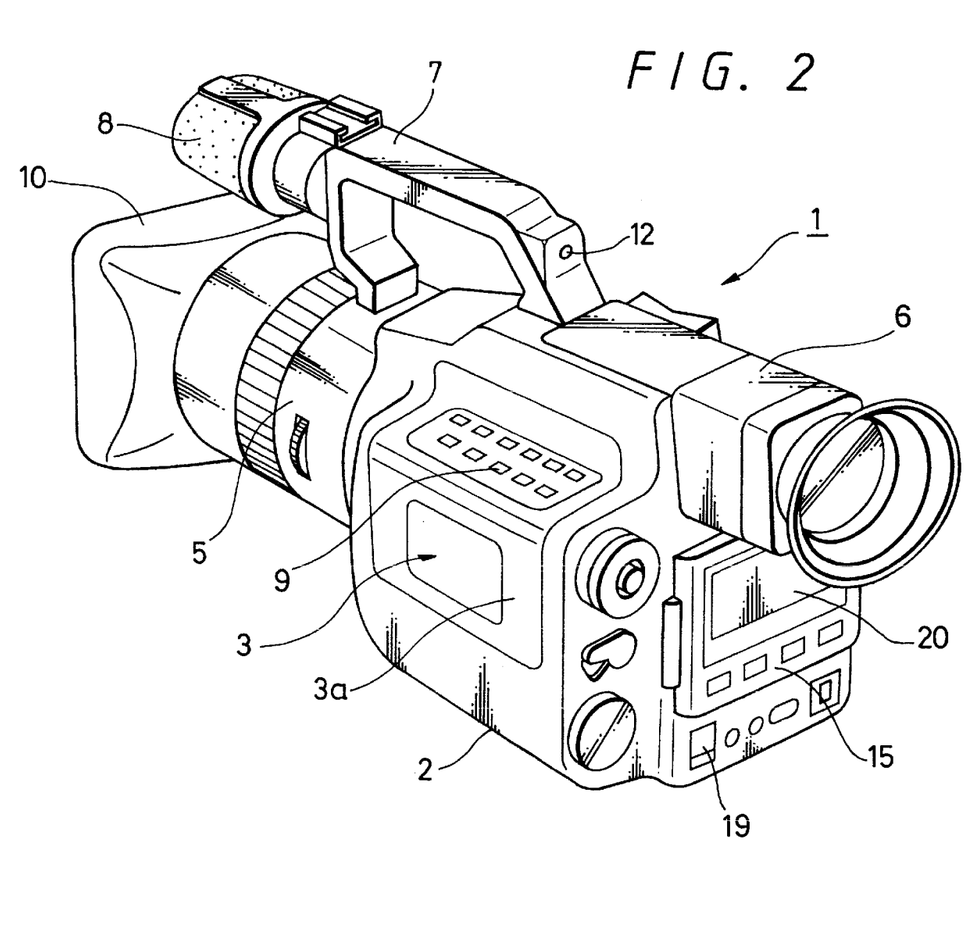
FIG. 2 is a perspective view of the VTR integrally combined with a video camera.
Figure 3:
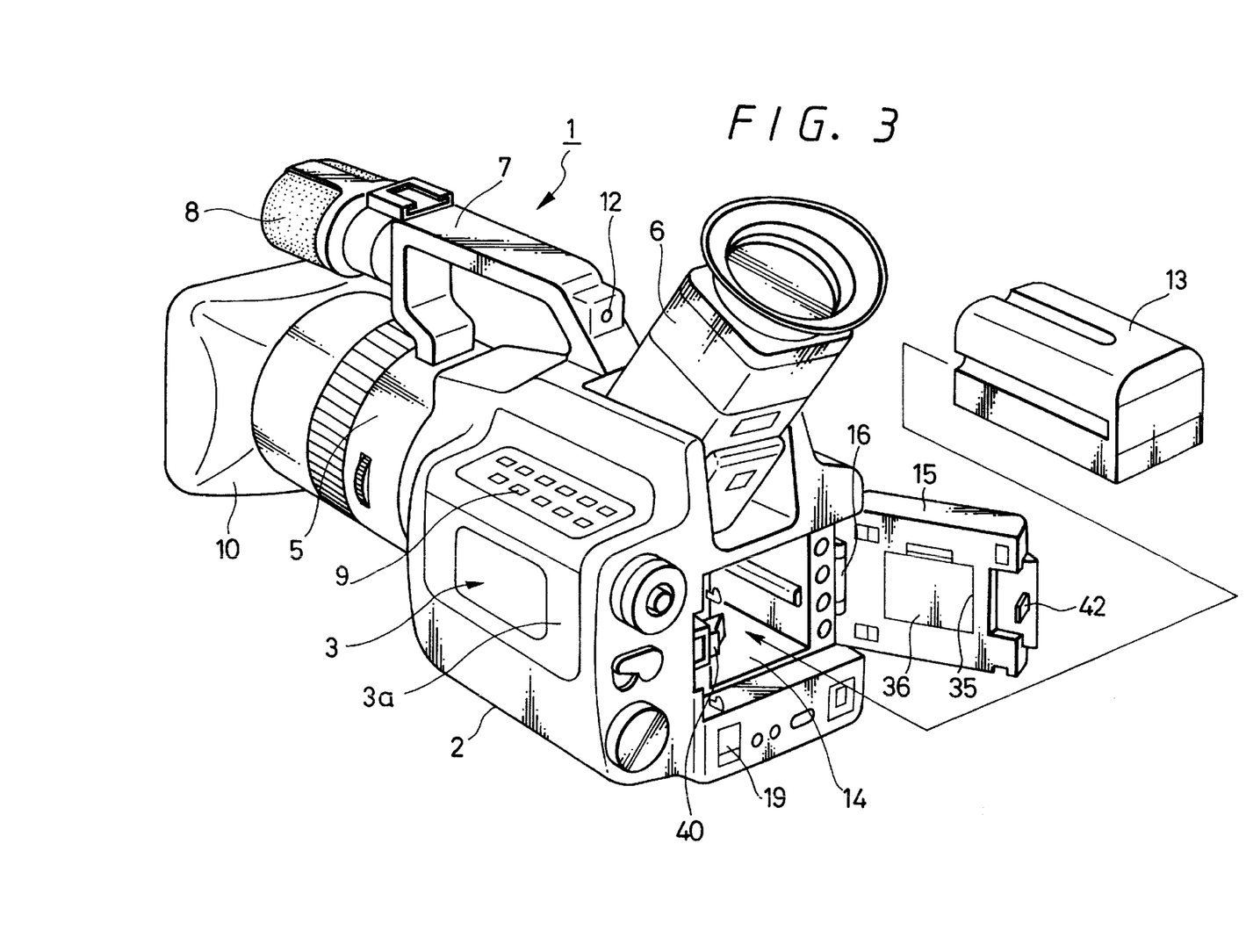
FIG. 3 is a perspective view of the VTR integrally combined with a video camera, with a battery cover being open.

FIGS. 1 through 3 show in perspective view a VTR 1 integrally combined with a video camera as an electronic device according to the present invention. The VTR 1 integrally combined with a video camera has a housing 2 including a cassette loading unit 3 mounted in one side thereof, and a lens barrel 5 mounted on a front end of the housing 2, the lens barrel 5 including a lens system 4. The housing 2 also has a viewfinder 6 on a rear upper wall thereof, a grip handle 7 on a front upper wall thereof, and a microphone 8 projecting forward from a front end of the grip handle 7.

The cassette loading unit 3 can be opened and closed by a cassette cover 3a, and houses therein a tape transport mechanism (not shown) for driving a magnetic tape of a video tape cassette that is loaded in the cassette loading unit 3.

The cassette cover 3a supports face a set of pushbutton control keys 9 for performing basic functions of the VTR 1, including a recording function, a playback function, a fast-forward function, a rewinding function, a stop function, a pause function, and so on.

The housing 2 houses a charge-coupled device (CCD) positioned immediately behind the lens system 4 in the lens barrel 5, for converting image light which has entered through the lens system 4 into an image signal. The image signal produced by the CCD, together with an audio signal picked up by the microphone 8, is recorded on the magnetic tape in the video tape cassette that is loaded in the cassette loading unit 3.

A hood 10 for preventing extraneous light from being applied to the lens system 4 is mounted on the front end of the lens barrel 5.

The viewfinder 6 has an image display screen disposed therein for displaying images which are being currently captured by the CCD and also images which have been recorded on the magnetic tape in the loaded video tape cassette and are being currently reproduced. The viewfinder 6 is universally angularly movable with respect to the housing 2 so that the user of the VTR 1 can see the image display screen at any desired angle with respect to the housing 2.

The grip handle 7 will be gripped by hand when the user carries the VTR 1 around. The microphone 8 is mounted on the front end of the grip handle 7 such that it projects forward parallel to the lens barrel 5. Remote control signal receivers 11, 12 are mounted respectively on a front end of the microphone 8 and a rear end of the grip handle 7.

The VTR 1 of the above construction is powered by a rechargeable battery 13 which is placed within the housing 2 as shown in FIG. 3.

Specifically, the battery 13 is inserted in a battery casing 14 which is disposed in the housing 2 and is open rearward at a rear end face of the housing 2. The rear open end of the battery casing 14 can be openably enclosed by a battery cover 15 that is pivotally attached horizontally to the housing 2 by a hinge 16.

The battery cover 15 can be loaded in a closing position by a lock mechanism disposed between the battery cover 15 and the housing 2.

Figure 5:
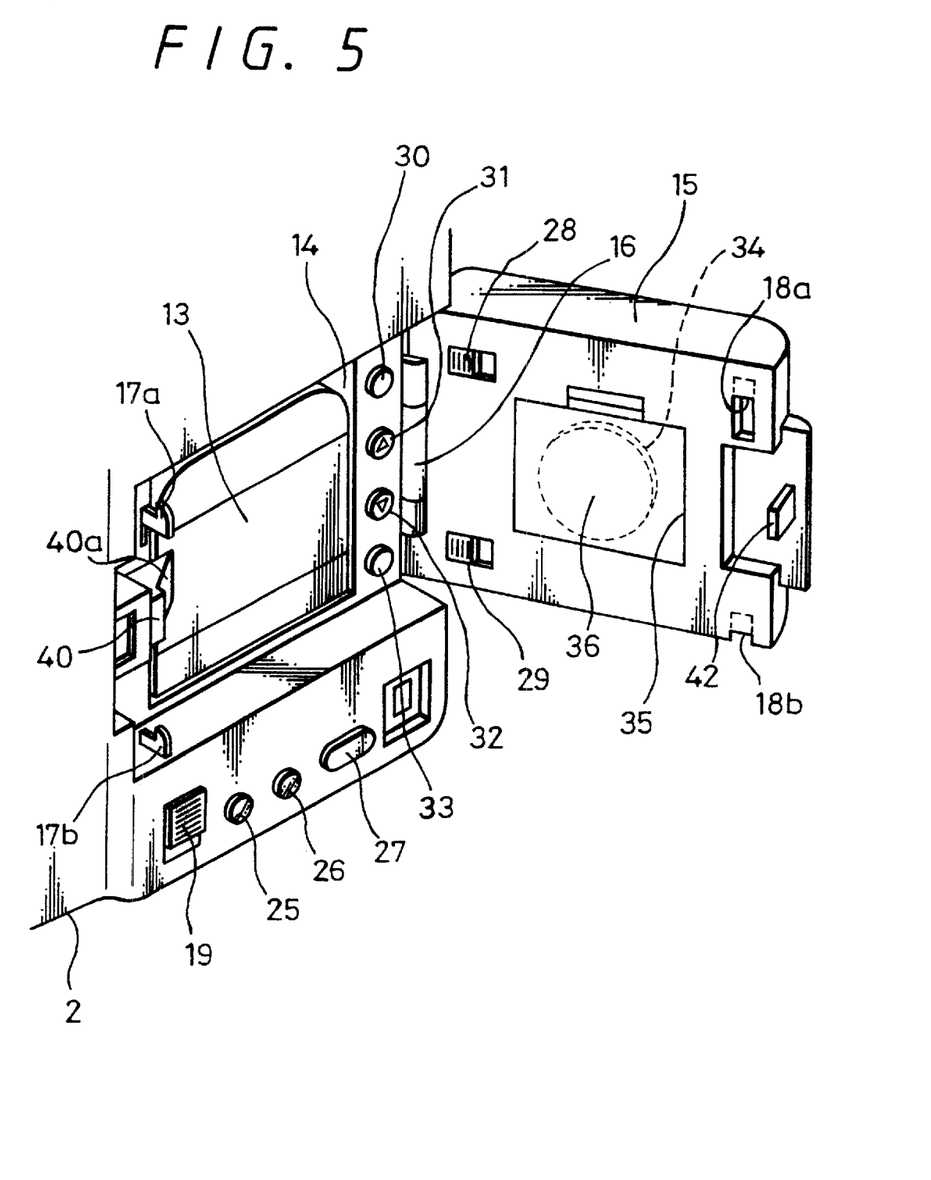
FIG. 5 is an enlarged perspective view of a battery placed in a battery casing with the battery cover being open.

Specifically, as shown in FIG. 5, the housing 2 has upper and lower hooks 17a, 17b disposed on one side of the rear open end of the battery casing 14 remotely from the hinge 16, and the battery cover 15 has upper and lower recesses 18a, 18b disposed on an end thereof remotely from the hinge 16. When the battery cover 15 is fully closed over the rear open end of the battery casing 14, the upper and lower hooks 17a, 17b can engage respectively in the upper and lower recesses 18a, 18b, locking the battery cover 15 in the closing condition.

More specifically, the upper and lower hooks 17a, 17b can be moved vertically when a lock-and-unlock button 19 positioned on the rear end of the housing 2 below the battery casing 14 is vertically moved. For example, when the lock-and-unlock button 19 is moved upwardly, the upper and lower hooks 17a, 17b move upwardly and engage in the respective upper and lower recesses 18a, 18b, locking the battery cover 15. When the lock-and-unlock button 19 is moved downwardly, the upper and lower hooks 17a, 17b move downwardly and disengage from the respective upper and lower recesses 18a, 18b, unlocking the battery cover 15.

Figure 4:
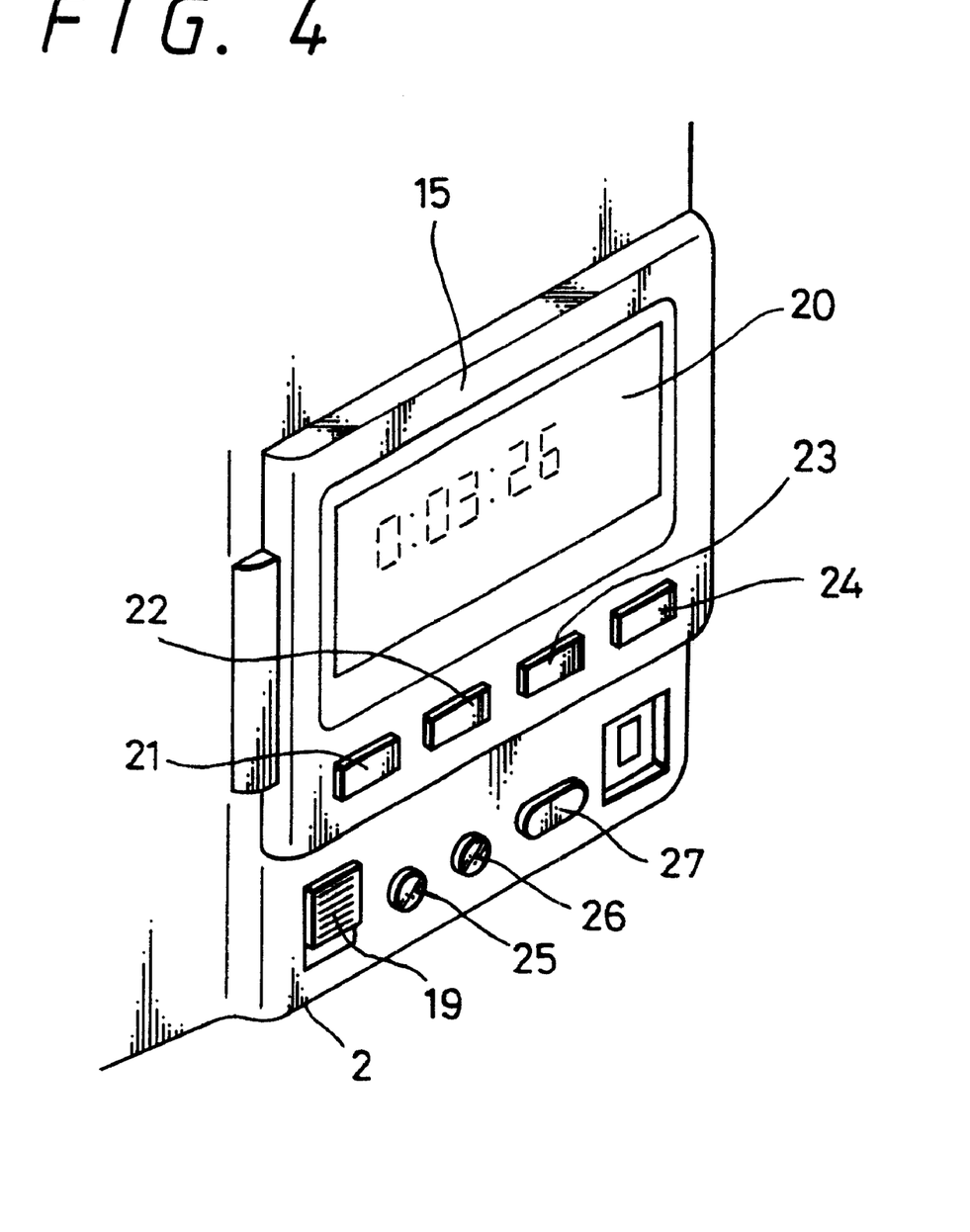
FIG. 4 is an enlarged perspective view of the battery cover and a region adjacent thereto.

As shown in FIGS. 2 and 4, the battery cover 15 supports a display unit 20 on an outer surface thereof. The display unit 20 comprises an LCD unit for displaying various pieces of information including operation statuses, modes, a time counter, warning messages, a remaining battery energy level, and so on.

The outer surface of the battery cover 15 also supports thereon a set of pushbutton control keys 21, 22, 23, 24 performing functions of the VTR 1, immediately below the display unit 20. For example, the control key 21 serves as a program automatic exposure (AE) setting key, the control key 22 as a shutter speed selecting key, the control key 23 as a white balance setting key, and the control key 24 as a recorded sound level adjusting key.

The rear end of the housing 2, which lies flush with the outer surface of the battery cover 15 when the battery cover 15 is fully closed, also supports thereon a set of pushbutton control keys 25, 26, 27. For example, the control key 25 serves as a key for resetting the time counter to zero, the control key 26 as a self-timer setting key, and the control key 27 as a one-push white balance setting key.

As shown in FIG. 5, the battery cover 15 also supports on its inner surface a set of control keys 28, 29 which comprise slide switches, the control keys 28, 29 being positioned near the hinge 16. For example, the control key 28 serves as a camera-shake correcting key, and the control key 29 as a digital function selecting key.

The battery cover 15 has a battery storage area 35 defined in the inner surface thereof for storing a lithium battery 34 for backing up a memory and a timer in the housing 2. The battery storage area 35 is normally closed by a cover plate 36, which can be removed for replacement of the lithium battery 34.

A rear end surface of the housing 2 which can be covered with the battery cover 15 also supports a set of pushbutton control keys 30, 31, 32, 33 positioned on the other side of the battery casing 14 near the hinge 16. For example, the control key 30 serves as a menu key, the control keys 31, 32 as selection keys, and the control key 33 as a setting key.

Figure 8A:
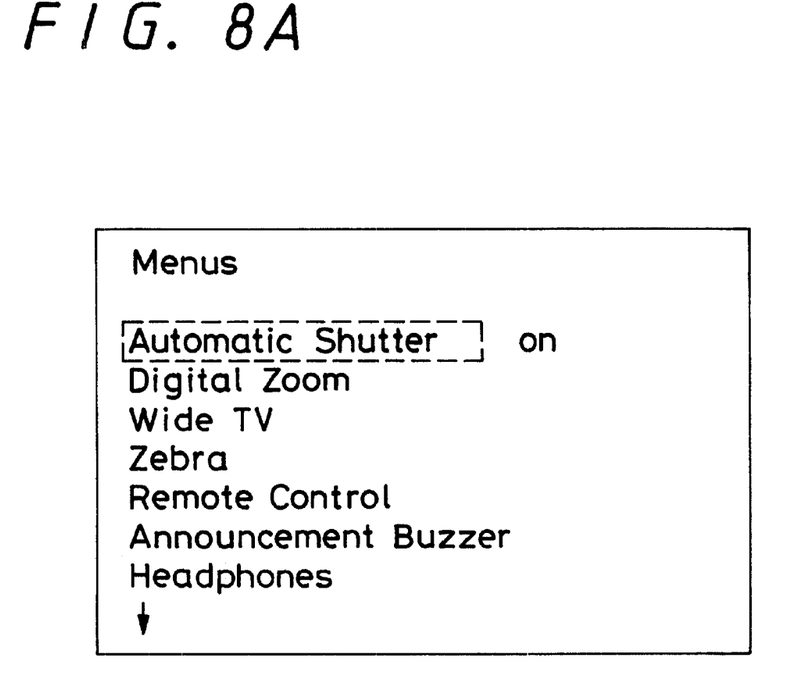
FIGS. 8A and 8B are views showing displayed menus by way of example.
Figure 8B:
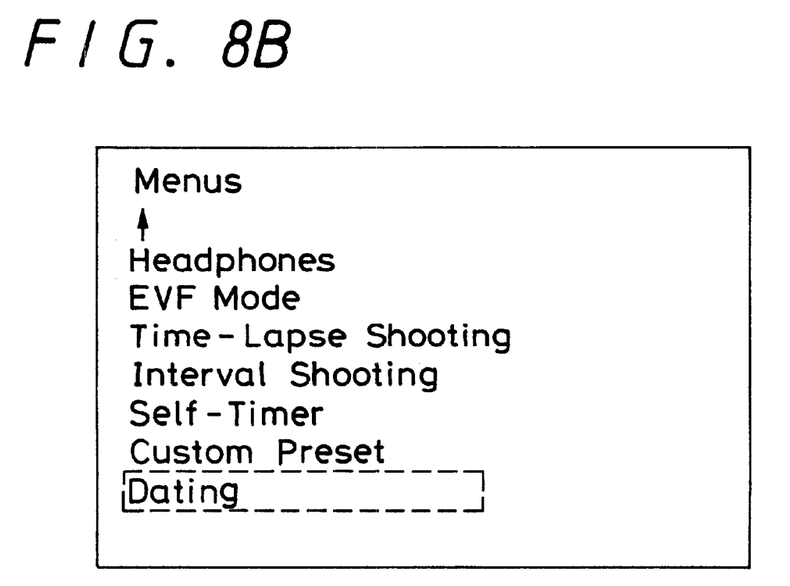

FIGS. 8A and 8B show menus representing functions that can be selected by the control keys 30, 31, 32, 33. Specifically, when the menu key 30 is pressed, the menus shown in FIGS. 8A and 8B are displayed on the image display screen in the viewfinder 6. When the selection key 31 or 32 is pressed, a cursor displayed as a dotted-line frame on the image display screen moves between the menus. When the setting key 33 at a desired menu is pressed, the function represented by the menu is performed.

As described above, the display unit 20, the control keys 21~33, and the battery storage area 35 are located in a manner to effectively utilize a limited space available on the VTR 1. Therefore, the VTR 1 may be reduced in size and may incorporate many more functions.

The VTR 1 has a battery retainer mechanism for retainer the battery 13 reliably in the battery casing 14.

Figure 6:
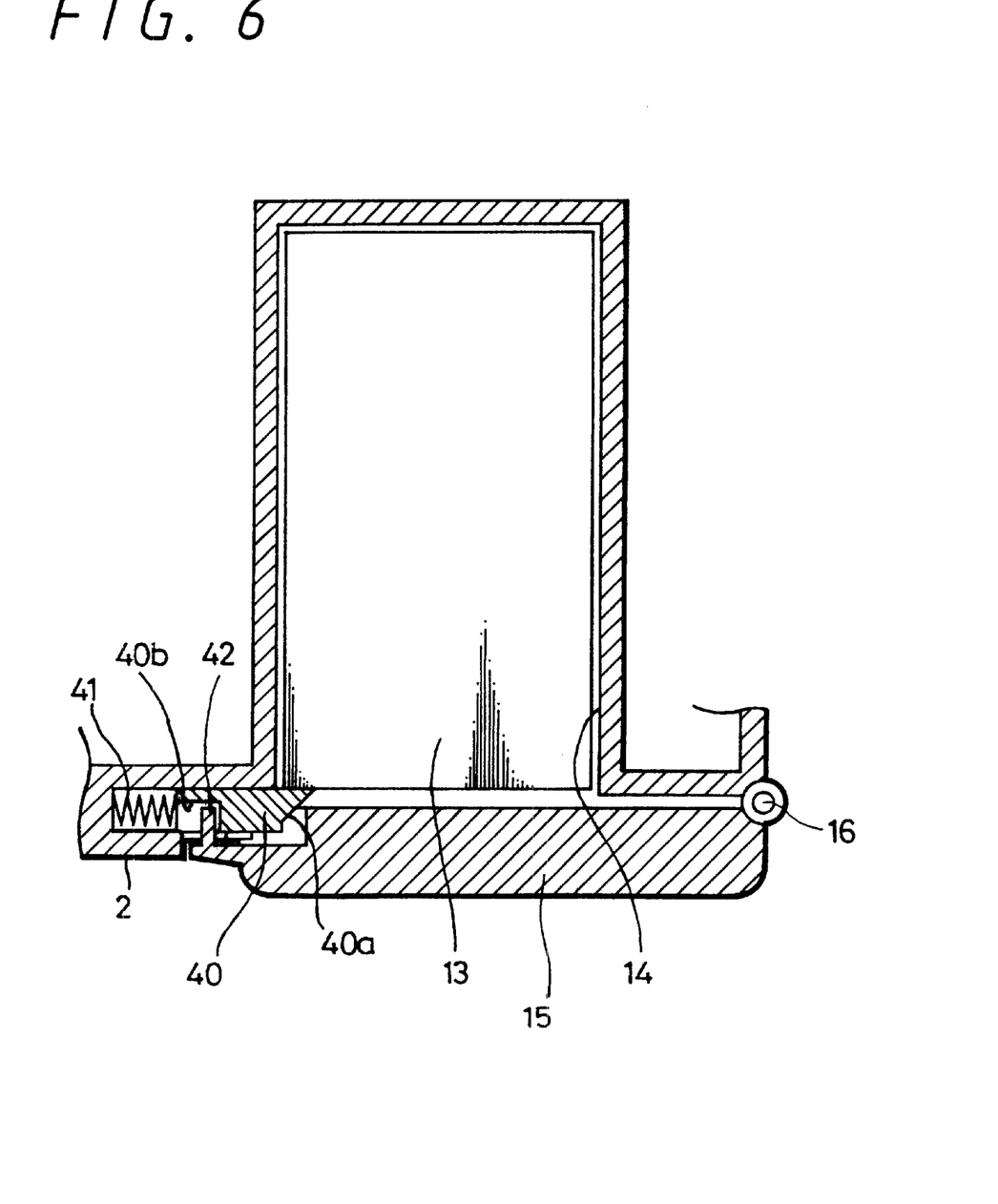
FIG. 6 is an enlarged horizontal cross-sectional view of the battery casing with the battery cover being fully closed.
Figure 7:
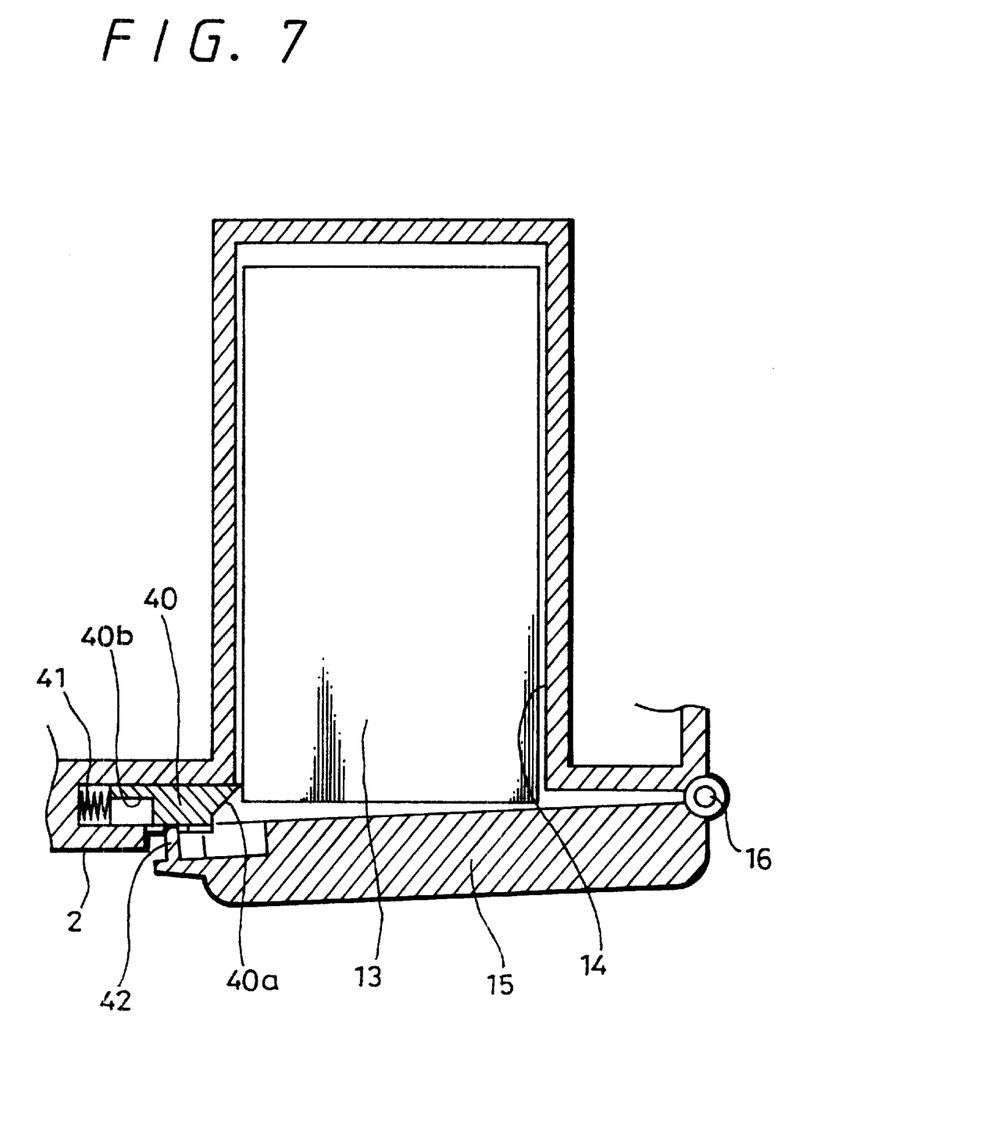
FIG. 7 is an enlarged horizontal cross-sectional view of the battery casing with the battery cover being not fully closed.

The battery retainer mechanism is shown in detail in FIGS. 6 and 7.

As shown in FIGS. 6 and 7, a battery lock finger 40 is mounted in the housing 2 for retaining the battery 13 securely in the battery casing 14. The battery lock finger 40 is slidable into and out of the open rear end of the battery casing 14 in directions perpendicular to the direction in which the battery 13 can be inserted into the battery casing 14.

The battery lock finger 40 is normally biased to project into the open rear end of the battery casing 14, as shown in FIG. 6, under forces from a spring 41 disposed in the housing 2 and acting on the rear end of the battery lock finger 40. When the battery 13 is fully inserted in the battery casing 14, the battery lock finger 40 projects into the open rear end of the battery casing 14 and lockingly engages the outer end of the battery 13, thereby securely retaining the battery 13 in the battery casing 14 to guard against accidental removal from the battery casing 14.

The battery lock finger 40 has an outer slanted surface 40a tapered off toward the front end thereof. When the battery 13 is inserted into the battery casing 14, the slanted surface 40a is pressed by the battery 13, pushing the battery lock finger 40 out of the open rear end of the battery casing 14 against the bias of the spring 41 as shown in FIG. 7. When the battery 13 is fully inserted in the battery casing 14, the battery lock finger 40 projects into the open rear end of the battery casing 14 under the bias of the spring 41, and locks the battery 13 securely in the battery casing 14.

For removing the battery 13 from the battery casing 14, the battery lock finger 40 is pushed directly by a finger out of the open rear end of the battery casing 14 against the bias of the spring 41 until the battery lock finger 40 is brought out of locking engagement with the battery 13.

A mechanism for preventing the cover 15 from being fully closed as long as the battery 13 is incompletely inserted is disposed between the battery lock finger 40 and the battery cover 15.

Such a mechanism comprises a recess 40b defined in the battery lock finger 40 and a tooth 42 projecting on the battery cover 15 for alignment with the recess 40b.

Specifically, as shown in FIG. 6, when the battery 13 is fully inserted in the battery casing 14 and engaged by the battery lock finger 40 against accidental dislodgment, the tooth 42 on the battery cover 15 is aligned with and enters the recess 40b in the battery lock finger 40, allowing the battery cover 15 to be fully closed over the open rear end of the battery casing 14.

On the other hand, as shown in FIG. 7, when the battery 13 is not fully inserted in the battery casing 14, the battery lock finger 40 abuts against a side of the battery 13 and remains out of the open rear end of the battery casing 14 against spring-biased movement into the projecting position. At this time, the recess 40b is kept out of alignment with the tooth 42. Therefore, even when the user attempts to fully close the battery cover 15, the tooth 15 cannot enter the recess 42, but abuts against an outer side of the battery lock finger 40. As a result, the battery cover 15 cannot fully be closed and hence cannot be locked, as shown in FIG. 7.

Insofar as the battery cover 15 is not fully closed, it gives the user a clear visual indication representing that the battery 13 is not completely inserted in the battery casing 14, prompting the user to insert the battery 13 fully into the battery casing 14.

The present invention has been described above with respect to the VTR integrally combined with a video camera. However, the principles of the present invention are also applicable to any of various electronic devices which are powered by batteries inserted therein.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A video camera device, comprising:

a housing having a battery casing for accommodating a battery therein;

a battery cover mounted on said housing for openably enclosing said battery casing;

a display mounted on said battery cover for displaying information relative to the video camera device;

a controller mounted on said battery cover, for controlling the video camera device;

one or more control buttons mounted on a rear end surface of said housing which can be covered with said battery cover; and a storage device mounted in said battery cover, for storing a backup battery;

wherein said display and said controller are substantially positioned on said battery cover along a viewing direction of said video camera device.

2. The video camera device of claim 1 wherein said information relative to the video camera device represents at least one of:

an operation status, a mode, a time counter, a warning message, and a remaining battery energy level.

3. The video camera device of claim 1 wherein said controller further includes means for controlling at least one of:

a program automatic exposure setting function, a shutter speed selecting function, a white balance setting function, a camera-shake correcting function, and a digital function selection function.

* * * * *

UNITED STATES PATENT AND TRADEMARK OFFICE
CERTIFICATE OF CORRECTION

PATENT NO.    : 6,434,325 B1
DATED         : August 13, 2002
INVENTOR(S)   : Yasushi Noda et al.

It is certified that error appears in the above-identified patent and that said Letters Patent is hereby corrected as shown below:

Column 2,
Line 48, after "supports" insert -- on its upper sur --.

Column 4,
Line 32, change "retainer" to -- retaining --.

Signed and Sealed this

First Day of April, 2003

JAMES E. ROGAN
*Director of the United States Patent and Trademark Office*